(No Model.) 3 Sheets—Sheet 1.
H. WINTERWERBER.
MACHINE FOR CUTTING TOBACCO AND OTHER SUBSTANCES.

No. 447,095. Patented Feb. 24, 1891.

(No Model.) 3 Sheets—Sheet 2.
H. WINTERWERBER.
MACHINE FOR CUTTING TOBACCO AND OTHER SUBSTANCES.
No. 447,095. Patented Feb. 24, 1891.
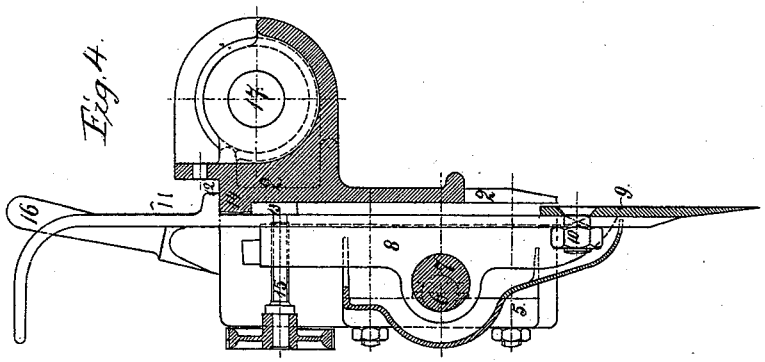
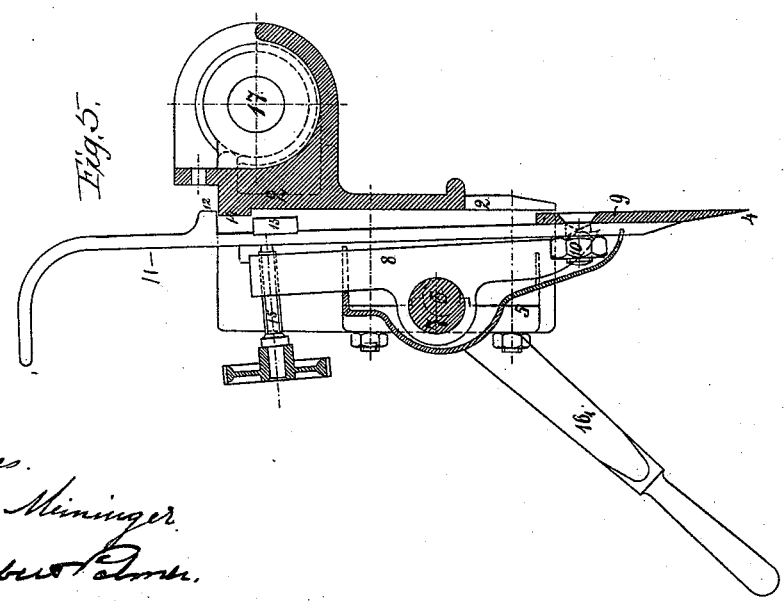

(No Model.) 3 Sheets—Sheet 3.
H. WINTERWERBER.
MACHINE FOR CUTTING TOBACCO AND OTHER SUBSTANCES.
No. 447,095. Patented Feb. 24, 1891.
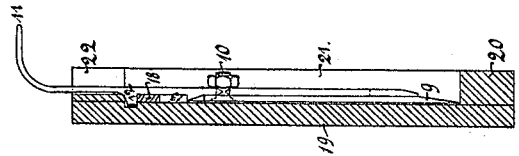
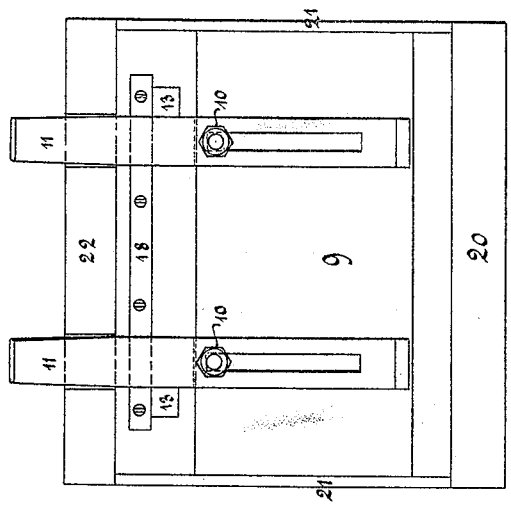

UNITED STATES PATENT OFFICE.

HEINRICH WINTERWERBER, OF OFFENBACH, NEAR FRANKFORT, GERMANY, ASSIGNOR TO FERDINAND FLINSCH MACHINE BUILDING CO., OF SAME PLACE.

MACHINE FOR CUTTING TOBACCO AND OTHER SUBSTANCES.

SPECIFICATION forming part of Letters Patent No. 447,095, dated February 24, 1891.

Application filed September 11, 1889. Serial No. 323,793. (No model.) Patented in Germany December 11, 1888, No. 48,987.

*To all whom it may concern:*

Be it known that I, HEINRICH WINTERWERBER, a subject of the Emperor of Germany, residing at Offenbach, near Frankfort-on-the-Main, Germany, have invented a new and useful Improvement in Machines for Cutting Tobacco and other Substances, (for which Patent No. 48,987, dated December 11, 1888, has been obtained by another, with my consent as inventor, in Germany,) of which the following is a specification.

This invention relates to machines for cutting tobacco and other substances in which a knife is reciprocated across the mouth of a chute through which the substance to be cut is fed, and particularly to means for adjusting the knife edgewise and laterally with respect to the chute, and for detaching and refixing the knife for grinding, repairing, or renewing, so that the substance may be cleanly and accurately cut.

The principal object of my invention is to facilitate the adjustment, removal, and refixing of the knife, permitting the same to be accomplished while the machine is in operation.

The invention by which I attain this end comprises various novel features hereinafter pointed out in the claims, and in order that the invention may be clearly understood I shall, previous to claiming the same, describe in detail the mode in which the invention is carried into effect.

Reference is to be had to the accompanying drawings, forming part of this specification, in which—

Figure 1:
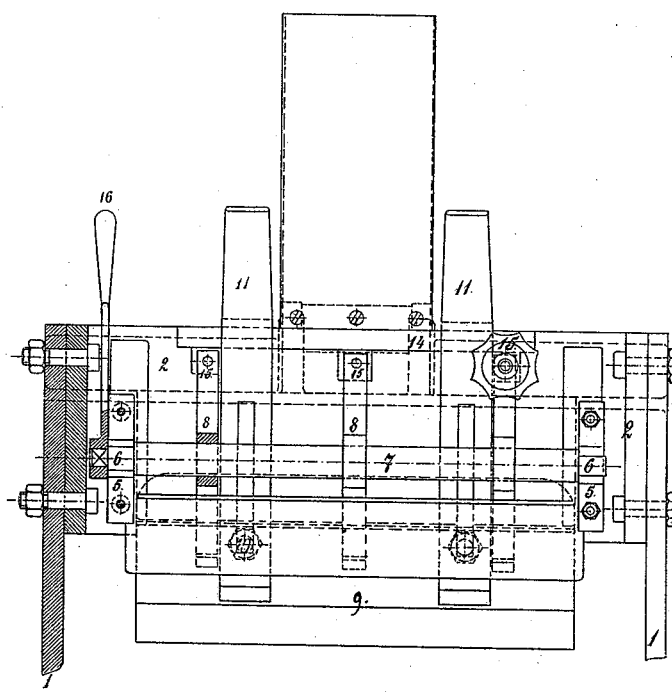
Figure 2:
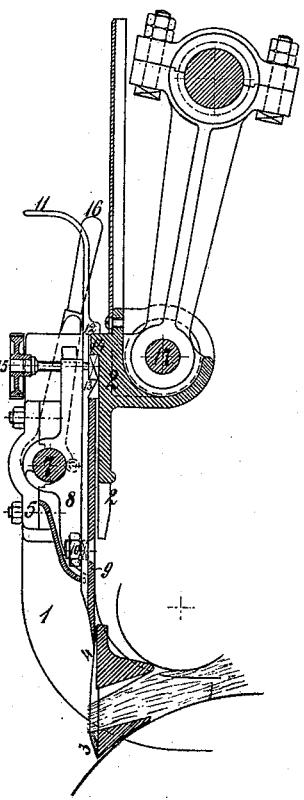
Figure 3:
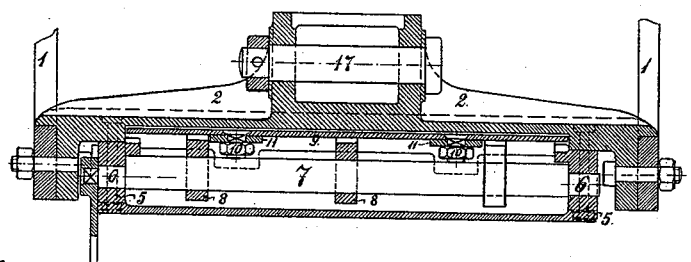

Figure 1 is a front elevation showing such parts of a machine embodying my invention as are essential to a clear understanding thereof, parts being in section. Fig. 2 is a central cross-sectional elevation of the same. Fig. 3 is a sectional plan view of the same. Figs. 4 and 5 are enlarged sectional elevations similar to Fig. 2, showing different lateral adjustments of the knife-holding devices. Figs. 6 and 7 are face and sectional views, respectively, of the device for adjusting the knife edgewise.

Like numerals of reference designate corresponding parts in the several figures of the drawings.

3 designates the chute of the machine through which the tobacco or other substance to be cut is fed, as by the roller indicated in Fig. 2, and 9 the knife, the edge 4 of which is reciprocated vertically across the mouth of the chute 3, so as to cut the substance issuing therefrom in a well-known manner. The knife 9 is attached to the lower ends of two longitudinally-slotted arms 11 by set-screws 10 passing through said slots, so as to be adjustable on said arms 11, and on the upper part of each of said arms is formed a pair of lugs 12 13, which embrace a transverse rib 14 on the face of the knife-carrying plate 2, against the lower part of which the knife 9 rests, so that as said knife-plate 2, with its side arms 1, is reciprocated vertically, as by the connecting-rod coupled to the pin 17 on its back, in a well-known manner, the knife 9 will be held against vertical movement on the plate 2 by said lugs 12 and 13 and rib 14. To keep the lugs 12 and 13 in engagement with the rib 14 on the plate 2, a plurality of clamping-blocks 8 are mounted to swing medially on a horizontal shaft 7, placed across the front of the knife 9 and having eccentric-journals 6 on its ends, mounted in bearings 5, fixed to the plate 2, the lower ends of which clamping-blocks 8 bear directly against the lower part of the knife 9, while the upper ends of the clamping-blocks 8 carry adjusting-screws 15, which work against bearings formed by lateral extensions of the lugs 13 on the upper part of the knife. With this arrangement the edge of the knife 9 can be adjusted as close as desired to the mouth of the feed-chute 3 by turning the adjusting-screws 15 so as to swing the clamping-blocks 8 on the shaft 7 and cause their lower ends to press the lower part of the knife inward.

On one eccentric-journal 6 of the shaft 7 is fixed a handle-arm 16, the adjustment being such that when said arm 16 is upright, as in Figs. 1, 2, and 4, the eccentricity of the shaft-journals will cause the clamping-blocks 8 to bind the knife closely to the plate 2; but when said arm 16 is thrown down, as in Fig. 5, the rotation of the eccentrically-mounted shaft 7 will draw the clamping-blocks 8 outward, whereby, on pulling the handles formed on the upper ends of the knife-arms 11 outward, the lugs 12 and 13 may be disengaged laterally from the plate-rib 14, and the knife 9 then lifted by said handle-arms 11 out from between the clamping-blocks 8 and plate 2, for grinding, renewal, or inspection, as desired.

The new or repaired knife may be as readily replaced between the clamping-blocks 8 and plate 2, its lugs 12 and 13 engaged with the rib 14, and the knife then firmly fixed to the plate 2 by simply raising the handle-arm 16 to its former upright position.

For adjusting the new or repaired knife 9 on the arms 11 previous to replacing it on the plate or carrier 2, so that the edge of the knife will descend the exact required distance below the mouth of the chute 3, the set-screws 10, holding the knife to the arms 11, are loosened and the lugs 12 and 13 engaged, as shown in Figs. 6 and 7, with a rib 18, provided on a trial-plate 19, which is also provided with a wooden or other non-abrasive rib 20 at a distance from the rib 18 equal to the proper distance of the rib 14 of the carrier 2 from the lower edge of the knife 9 when in place thereon. The edge of the knife 9 on the trial-plate being then moved to contact with the non-abrasive rib 20 and the set-screws 10 tightened, the knife 9 and its arms 11 will be ready for application to the carrier 2, as described.

I claim as my invention—

1. In a machine for cutting tobacco, &c., the combination, with the movable knife-carrier having bearings, of a knife removable from said carrier, a shaft mounted eccentrically in the bearings on the carrier, clamping-blocks mounted to turn on said shaft and bearing against the knife, and means for turning said shaft, substantially as described.

2. In a machine for cutting tobacco, &c., the combination, with the movable knife-carrier having a transverse rib, of a knife removable from said carrier and having arms formed with lugs to embrace said rib and with handles for disengaging said lugs from the rib and removing the knife, and means for holding the knife to the carrier and the lugs in engagement with the rib, substantially as described.

3. In a machine for cutting tobacco, &c., the combination, with the movable knife-carrier having a transverse rib, of a knife removable from said carrier and having arms formed with lugs to embrace said rib and with screw-bearings, pivotal knife-clamping blocks on the knife-carrier, and adjusting-screws working in the clamping-blocks against said screw-bearings, substantially as described.

4. In a machine for cutting tobacco, &c., the combination, with the movable knife-carrier having bearings, of an eccentrically-mounted shaft turning in said bearings, pivotal knife-clamping blocks on the said shaft, and adjusting-screws on the said clamping-blocks acting on the knife, substantially as described.

5. In a machine for cutting tobacco, &c., the combination, with a knife-carrier having a rib, of a knife, arms having lugs to embrace said rib, and set-screws passing through slots, securing the arms adjustably to the knife, substantially as described.

In testimony whereof I have signed my name to this specification in the presence of two subscribing witnesses.

HEINRICH WINTERWERBER.

Witnesses:
FRANZ HASSLACHER,
JOSEPH PATRICK.